UNITED STATES PATENT OFFICE.

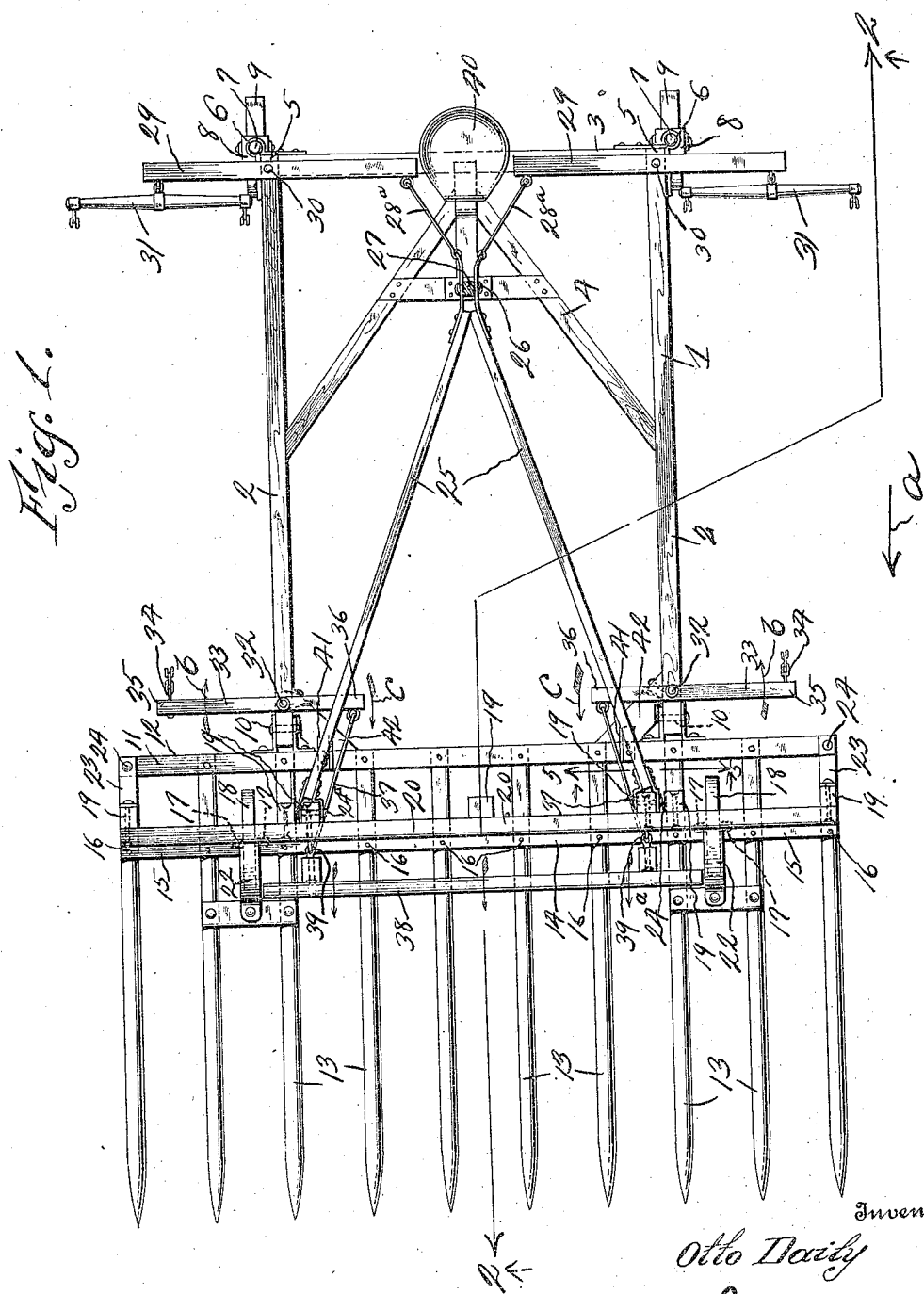

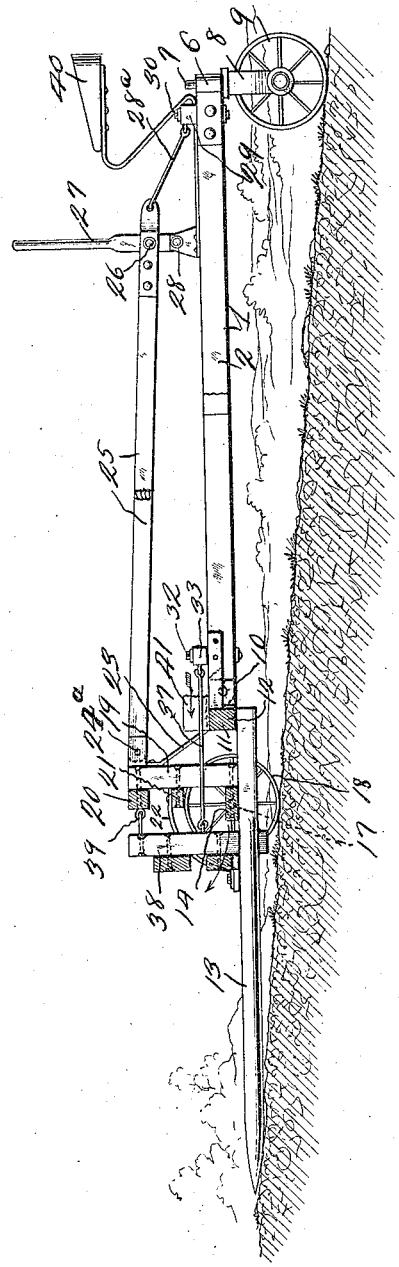

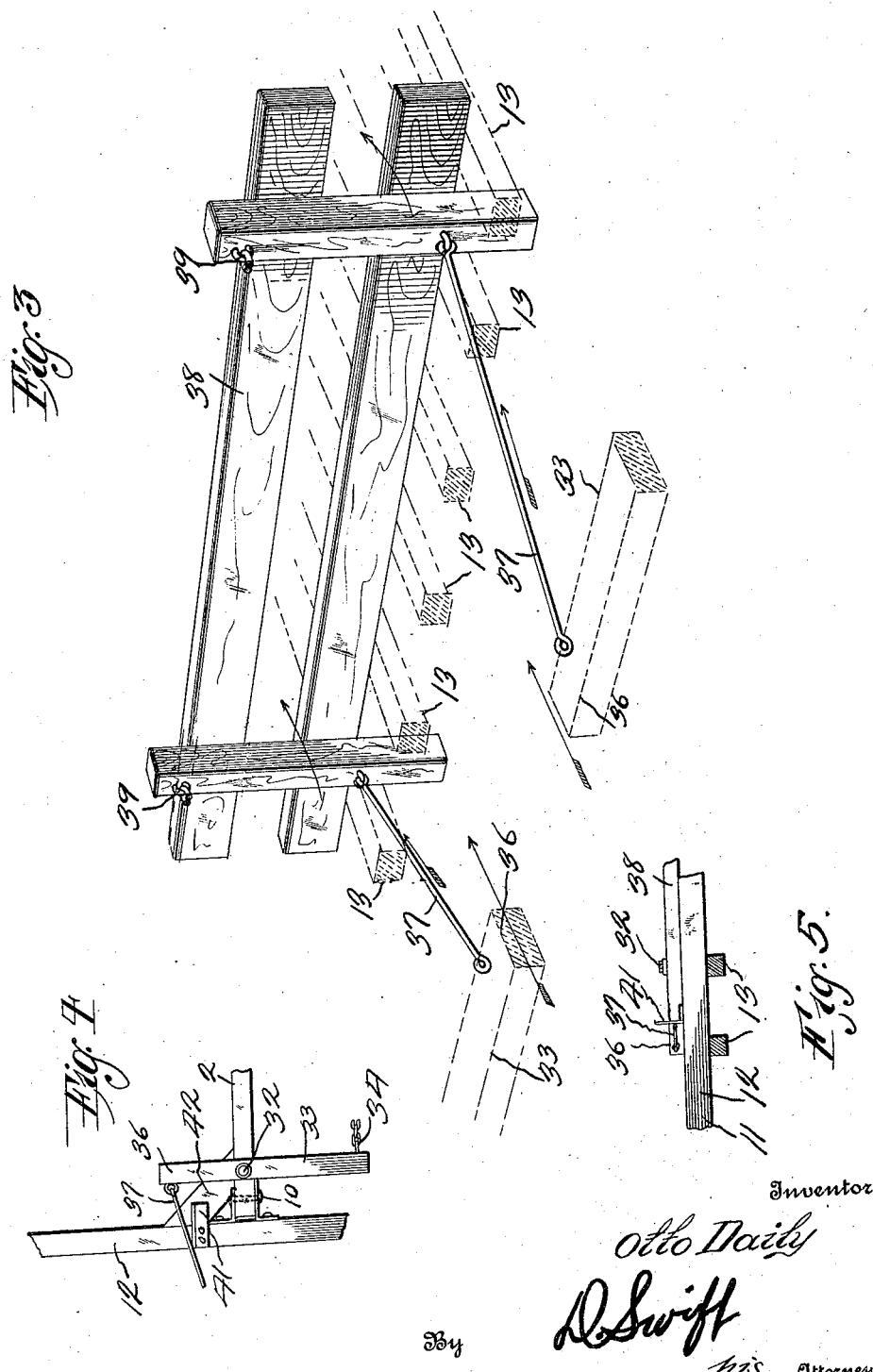

OTTO DAILY, OF LOGAN, KANSAS.

SWEEP-RAKE CLEANER.

1,414,071.   Specification of Letters Patent.   Patented Apr. 25, 1922.

Application filed December 29, 1919. Serial No. 347,919.

*To all whom it may concern:*

Be it known that I, OTTO DAILY, a citizen of the United States, residing at Logan, in the county of Phillips, State of Kansas, have invented a new and useful Sweep-Rake Cleaner; and I do hereby declare the following to be a full, clear, and exact description of the invention, such as will enable others skilled in the art to which it appertains to make and use the same.

The invention relates to wheeled rakes and particularly to that type of wheeled rakes known as sweep rakes and has for its object to provide a rake of this type, wherein the horses as they are held back will cause the rake fingers to be lowered onto the ground and the same action will cause a forward movement to a transversely disposed hinged member so as to start the hay or straw from the fingers, and the further backing of the rake as a whole, causing the fingers to be moved clear of the stack of hay or straw. Also to provide manually operated means whereby the rake fingers may be raised or lowered in relation to the ground.

A further object is to provide a sweep rake comprising a frame, said frame being provided with a pivoted rake member at its forward end and to provide means whereby horses may be hitched to the frame, rearwardly of the pivoted rake member, the hitching members of the horses being connected to a transversely pivoted finger clearing frame and so connected that as the horses are held back the fingers of the pivoted rake member will be lowered to the ground, the load thereon moved forwardly on the rake fingers by the transversely pivoted frame and the further backing of the horses clearing the fingers of the pivoted rake member from the stack of hay or straw.

With the above and other objects in view the invention resides in the combination and arrangement of parts as hereinafter set forth, shown in the drawings, described and claimed it being understood that changes in the precise embodiment of the invention may be made within the scope of what is claimed without departing from the spirit of the invention.

In the drawings:—

Figure 1 is a plan view of the wheeled rake.

Figure 2 is a longitudinal sectional view taken on line 2—2 of Figure 1.

Figure 3 is a perspective view of the rake finger cleaner frame looking at the same from the rear.

Figure 4 is a detail plan view of one of the forward corners of the rake frame.

Figure 5 is a detail sectional view taken on line 5—5 of Figure 1.

Referring to the drawings, the numeral 1 designates a U-shaped frame, which comprises the side bars 2 and the transversely disposed rear bar 3. The side bars 2 and the end bar 3 are braced and held in their relative positions by a centrally disposed frame work 4. The rear corners 5 of the frame are provided with vertically disposed bearings 6, in which bearings, shaft 7 of castings 8 are disposed. Castings 8 have rotatably mounted therein supporting wheels 9, which wheels support the rear end of the U-shaped frame 1.

Pivotally secured to the front ends of the side bars 2 as at 10 is a rake frame 11, which frame comprises a transversely disposed bar 12 to which bar is secured a series of longitudinally disposed rake bar fingers 13, said fingers being braced transversely by a transversely disposed bar 14 and end bars 15, which bars are secured to the rake fingers as at 16. Rotatably mounted in bearings 19 of the adjacent ends of the bars 14 and 15 are the pintles of wheels 18. Wheels 18 support the pivoted rake member spaced from the ground and also form a pivotal point on which the rake member is inclined downwardly at its forward end by mechanism hereinafter described.

Secured to the rear faces of the bars 14 and 15 are upwardly extending bars, which bars have their ends connected by a transversely disposed bar 20, there also being another transversely disposed bar 21 for additionally bracing the vertical bars 19. Extending forwardly and downwardly from the bar 21 are wheel guards 22 which prevent contact with the wheels of the material disposed on the rake fingers 13, during a raking operation. The frame formed by the bars 19, 20 and 21 is additionally braced by rearwardly extending braces 23, which have their upper ends connected to the end uprights 19 and their lower ends connected to the transversely disposed bar as at 24. It will be seen that the frame work formed by the bars 19, 20, and 21 will be rigidly braced. Pivotally secured as at 24ª to two of the upright bars 19 are rearwardly and inwardly extending connecting bars 25, which bars are in turn pivotally connected as at 26 to a lever 27, which is pivoted as at 28 in a bracket carried by the bracing frame 4. The bars 25 at a point to the rear of the lever 27 are provided with link connections 28ª with pivoted bars 29, said bars being pivoted to the frame 1 as at 30 and are provided with single trees 31, to which draft animals are adapted to be attached so that they will move the rake as a whole in the direction of the arrow $a$, Figure 1. Pivoted to the forward ends of the side bars 2, as at 32 and normally in a horizontal position are bars 33 to which the animal is also attached as at 34 so that a rearward rocking of the ends 35 of the bars 33 will be accomplished in the direction of the arrows $b$, Figure 1, and a forward rocking of the ends 36 in direction of the arrows $c$, shown in Figure 1. This rocking of the bars 33 being accomplished when the driver holds back on the horses so that connecting links 37 will be forced forwardly so that the lower end of a pivoted frame 38 will be forced forwardly at its bottom edge, said frame being pivoted as at 39 to the transversely disposed bar 20 so as to force the accumulated hay or straw forwardly on the fingers 13 at the same time that the lever 27 is forced forwardly by the operator of the seat 40.

The operation is as follows. The rake is moved in the direction of the arrow $a$ by the draft animals and during this forward movement the pivoted rake member may be moved upwardly or downwardly at its outer end by the manipulation of the lever 27 by the operator, however, the usual operation is the lowering of the forward ends of the rake fingers 13, so as to rake the straw from depressions in the ground. The upward movement of the pivoted rake member being limited by limiting stops 41 which engage angle blocks 42 carried by the side bars 2. After sufficient straw has been accumulated on the fingers 13 and it is desired to deposit the same on the ground, the operator holds back on the horses which will cause the rocking of the pivoted bars 29 and 33. This will cause the outer ends of the fingers of the pivoted rake member to come into contact with the ground so as to allow the straw to engage the ground and it will also cause a simultaneous outward movement of the pivoted frame 38, which will start the straw from the fingers 13 and the further backing of the animals will cause the fingers 13 to come from under the pile of deposited straw and clear the same. It has been found in the present construction of sweep rakes that when the machine is backed to clear the fingers from the stack of hay that said fingers will not at all times clear the stack, however, by providing the pivoted frame 38 which gives a simultaneous forward push to the stack of straw at the same time it is being placed in engagement with the ground that this difficulty is overcome.

The invention having been set forth what is claimed as new and useful is:—

1. A sweep rake comprising a wheel supported frame, a rake pivoted to the forward end of said frame, stops carried by the rake adjacent its pivotal points and overlying stops carried by the wheel supported frame, a transversely disposed pivoted rake cleaning frame, said rake cleaning frame being disposed above the rake and pivoted to a support carried by the rake, means connected to the support carried by the rake whereby said rake may be lowered at its free end and means to which draft animals are attached whereby upon holding back of the draft animals the lower end of the cleaning frame will be forced forwardly.

2. The combination with a wheel supported sweep rake frame having a raking element pivoted to its forward end, of horizontally disposed stops carried by the raking element adjacent its pivoted end, said stops overlying horizontally disposed stops carried by the wheel supported frame and forming means for limiting the upward pivotal movement of the raking element.

In testimony whereof I have signed my name to this specification in the presence of two subscribing witnesses.

OTTO DAILY.

Witnesses:
A. SHEARER,
LEWIS DAUGHERTY.